(12) United States Patent
Feng

(10) Patent No.: US 6,567,922 B1
(45) Date of Patent: May 20, 2003

(54) PULSE TYPE ACTIVATING SYSTEM FOR POWER SUPPLY

(76) Inventor: Hsiu-Mei Feng, 4F, No. 59-1, Tsao Di Wei, Shen-KEng Hsiang, Taipei Hsien (TW)

(*) Notice: Subject to any disclaimer, the term of this patent is extended or adjusted under 35 U.S.C. 154(b) by 0 days.

(21) Appl. No.: 09/556,953

(22) Filed: Apr. 21, 2000

(51) Int. Cl.[7] .............................. G06F 1/26; G06F 1/28
(52) U.S. Cl. ................. 713/340; 713/300; 713/320; 323/901
(58) Field of Search ............................. 713/300, 320, 713/340; 323/205, 901

(56) References Cited

U.S. PATENT DOCUMENTS

| 5,350,992 A | * | 9/1994 | Colter ........................ 318/807 |
| 5,479,333 A | * | 12/1995 | McCambridge et al. ...... 363/49 |
| 5,973,483 A | * | 10/1999 | Jo ............................... 323/222 |
| 6,104,173 A | * | 8/2000 | Kojima ....................... 323/222 |
| 6,198,257 B1 | * | 3/2001 | Belehradek et al. ......... 323/222 |
| 6,239,407 B1 | * | 5/2001 | Thommes .............. 219/130.21 |

* cited by examiner

Primary Examiner—Thomas Lee
Assistant Examiner—Paul Yanchus
(74) Attorney, Agent, or Firm—Varndell & Varndell, PLLC

(57) ABSTRACT

Pulse type activating system for power supply, composed of a boosting circuit, a pulse width modulating (PWM) circuit, a sine-wave generating circuit, an MOSFET output circuit, an analog-to-digital converting circuit (ADC), a temperature sensing circuit, an overload detecting circuit, a short circuit detecting circuit, a warning circuit and a CPU. The CPU collectively controls the above circuits and in the instant of activation of the load, the CPU provides intermittent high voltage for shortening the activation time of the load. The CPU also provides protection effect for the load.

1 Claim, 11 Drawing Sheets

PULSE TYPE ACTIVATING SYSTEM FOR POWER SUPPLY

BACKGROUND OF THE INVENTION

The present invention relates to a pulse type activating system for power supply, in which a CPU collectively controls respective circuits and provides intermittent high voltage for shortening the activation time of the load. The pulse type activation system is especially applicable to those heavy tools necessitating great current and great voltage.

When activating a general electric appliance, the instantaneous activating current is very great. With 100 watt electric appliance exemplified, the instantaneous activating current is over 2–3 times higher than the original current. The instantaneous great current is extremely apt to damage the circuit of the electric appliance itself. A general DC-to-AC power supply is unable to provide sufficient high surge so that the ability in activating the electric appliance is affected. FIG. 1 shows a current versus time (A-T) curvature of a conventional power supply. It can be known from the diagram that for making the current reach the high surge point, a time period $T_x$ is cost. During $T_x$, the load is repeatedly activated. After the load is warmed up, the amount of the activation current is time by time accumulated until the activation current is able to activate the load. Furthermore, when the activation current is close to the high surge point, sometimes the load will misjudge and shut down due to overload.

SUMMARY OF THE INVENTION

It is therefore a primary object of the present invention to provide a pulse type activating system for power supply, in which a CPU collectively controls respective circuits.

It is a further object of the present invention to provide the above pulse type activating system for power supply, which is able to quickly activate a load.

It is still a further object of the present invention to provide the above pulse type activating system for power supply, which is able to protect the circuit of the load.

According to the above objects, the pulse type activating system for power supply of the present invention is composed of a boosting circuit, a pulse width modulating (PWM) circuit, a sine-wave generating circuit, an MOSFET output circuit, an analog-to-digital converting circuit (ADC), a temperature sensing circuit, an overload detecting circuit, a short circuit detecting circuit, a warning circuit and a CPU. The boosting circuit is connected with the pulse width modulating (PWM) circuit. The output end of the boosting circuit is connected with the MOSFET output circuit. The sine-wave generating circuit is connected with the MOSFET output circuit. The MOSFET output circuit is connected with both the overload detecting circuit and the short circuit detecting circuit. The CPU is connected with the pulse width modulating (PWM) circuit, the sine-wave generating circuit, the temperature sensing circuit, the overload detecting circuit, the short circuit detecting circuit, the analog-to-digital converting circuit (ADC) and the warning circuit. The CPU collectively controls the above circuits and in the instant of activation of the load, the CPU provides intermittent high voltage for shortening the activation time of the load. The CPU also provides protection effect for the load.

The present invention can be best understood through the following description and accompanying drawings wherein:

DETAILED DESCRIPTION OF THE PREFERRED EMBODIMENT

Figure 3:
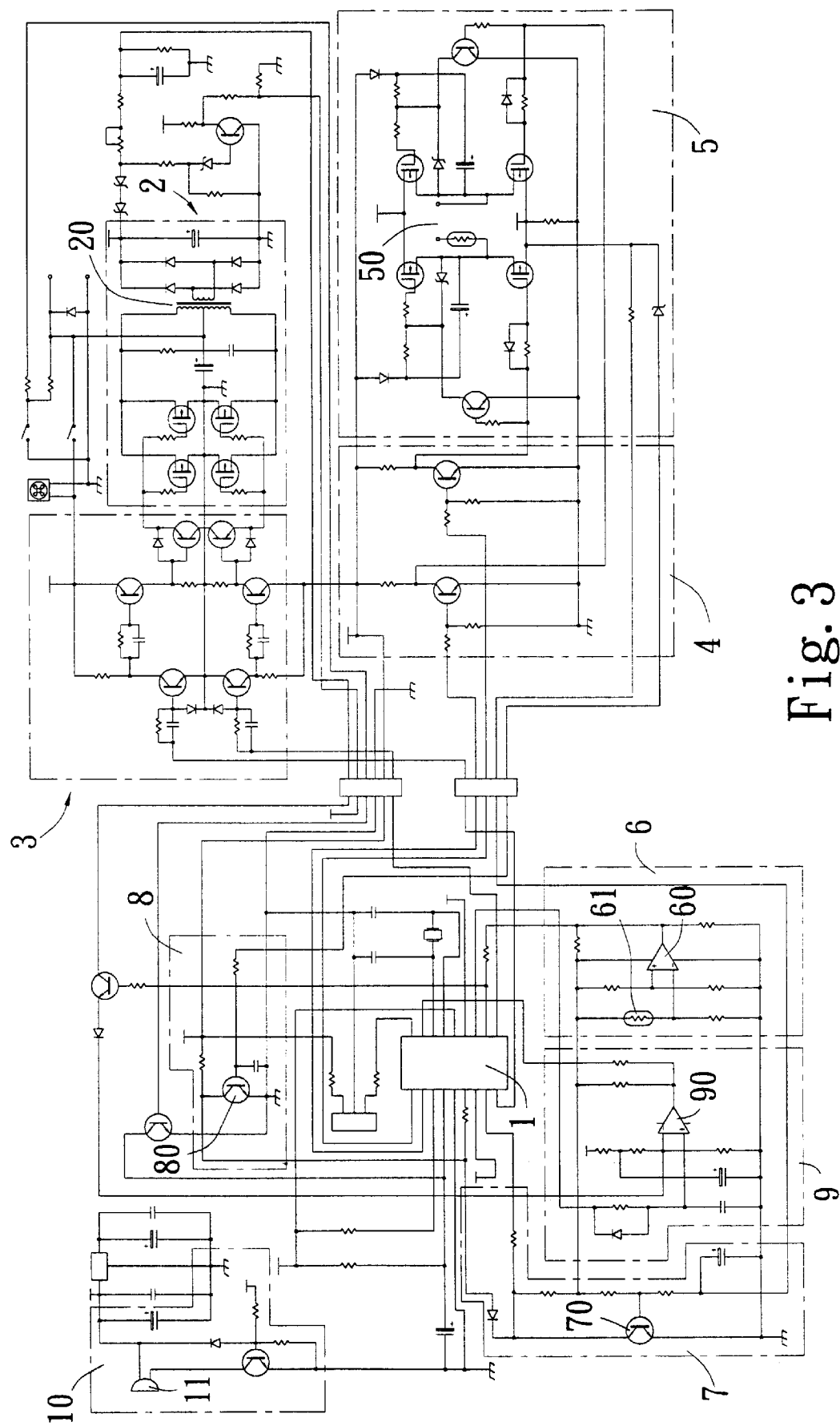
FIG. 3 is a complete circuit diagram of the present invention.
Figure 4:
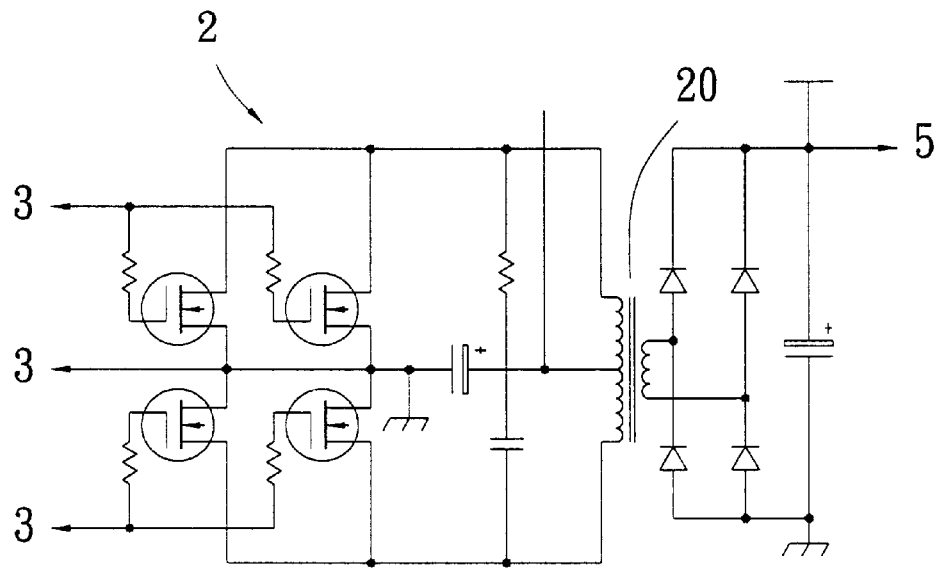
FIG. 4 is a circuit diagram of the boosting circuit of the present invention.
Figure 5:
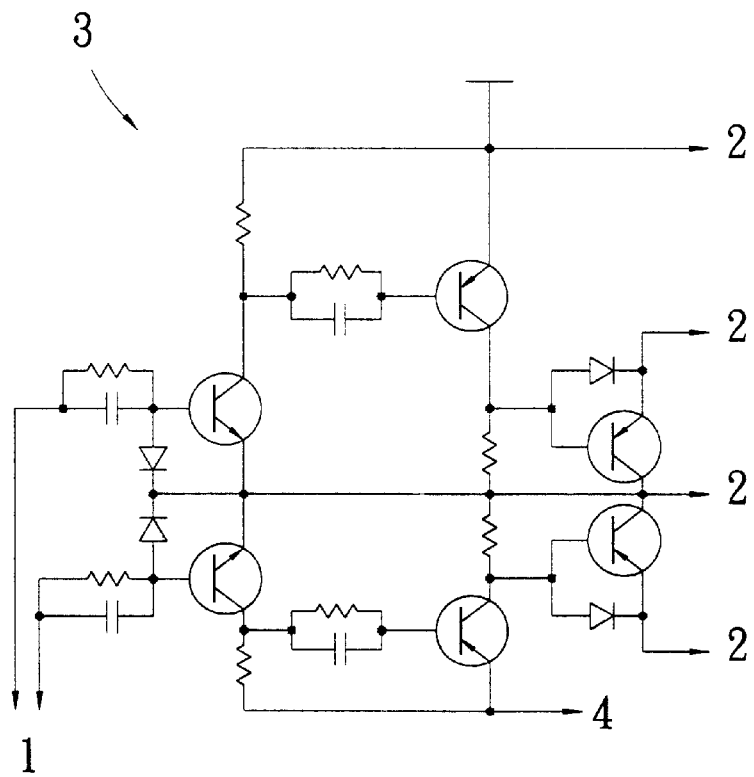
FIG. 5 is a circuit diagram of the pulse width modulating (PWM) circuit of the present invention.
Figure 6:
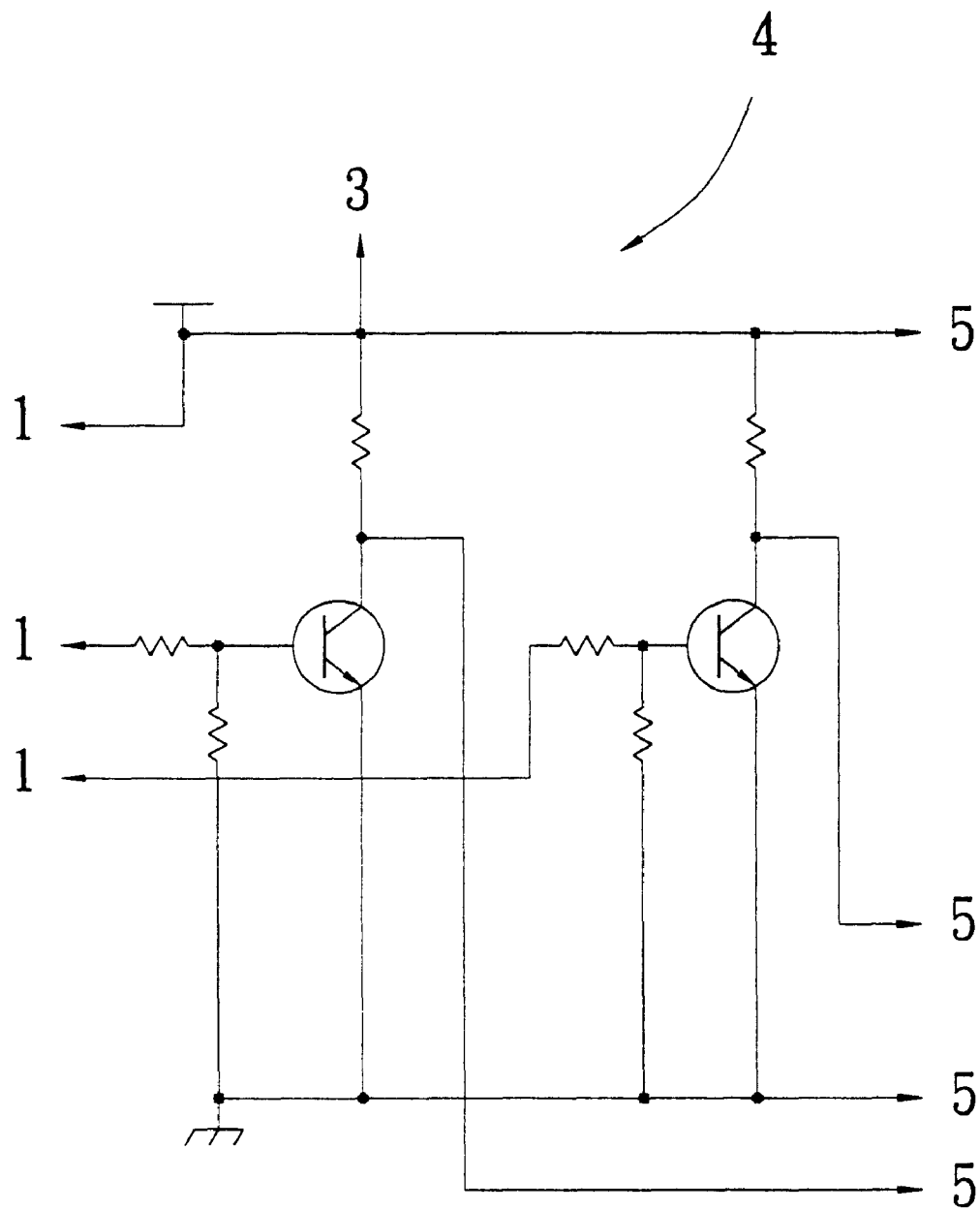
FIG. 6 is a circuit diagram of the sine-wave generating circuit of the present invention.
Figure 7:
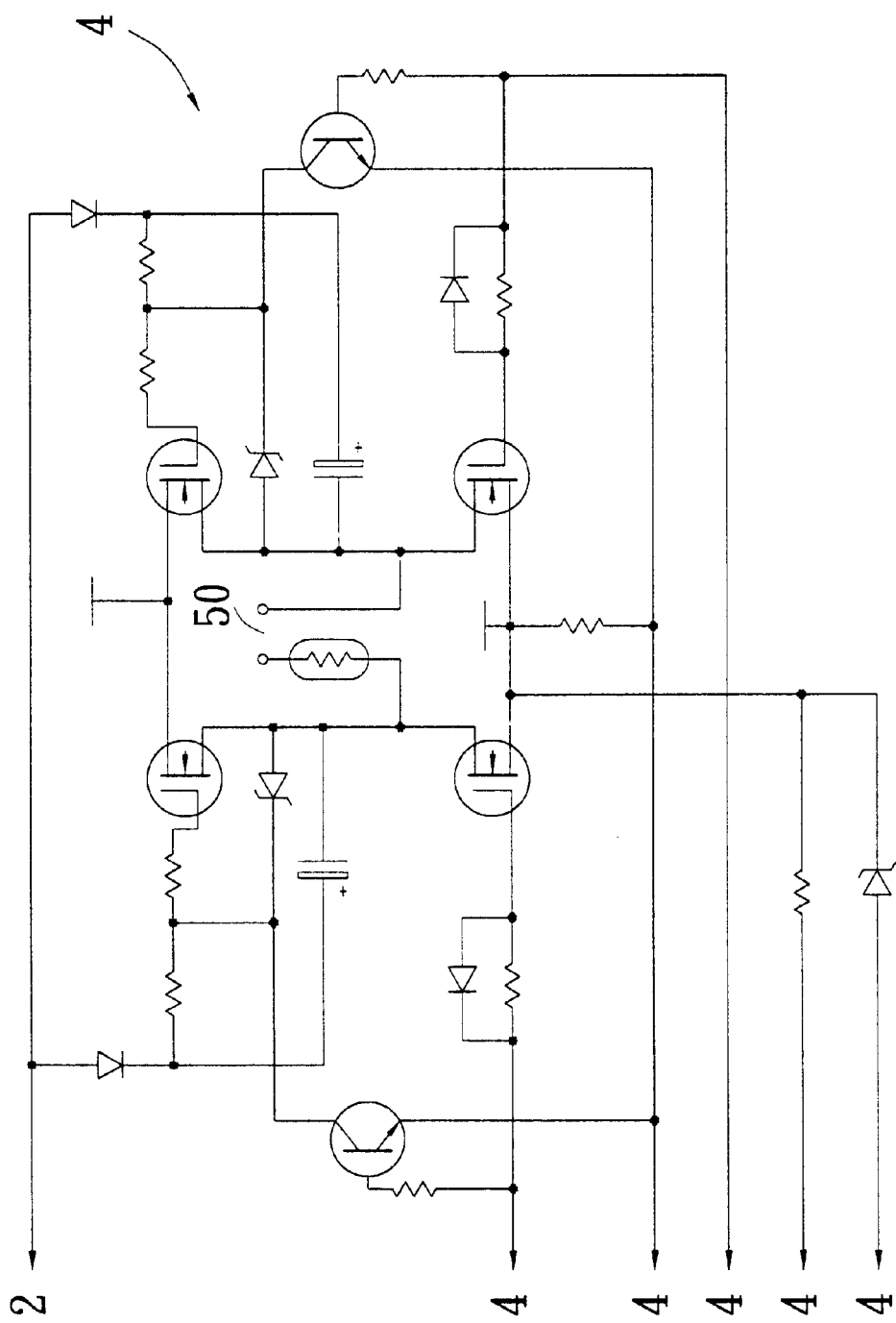
FIG. 7 is a circuit diagram of the MOSFET output circuit of the present invention.
Figure 8:
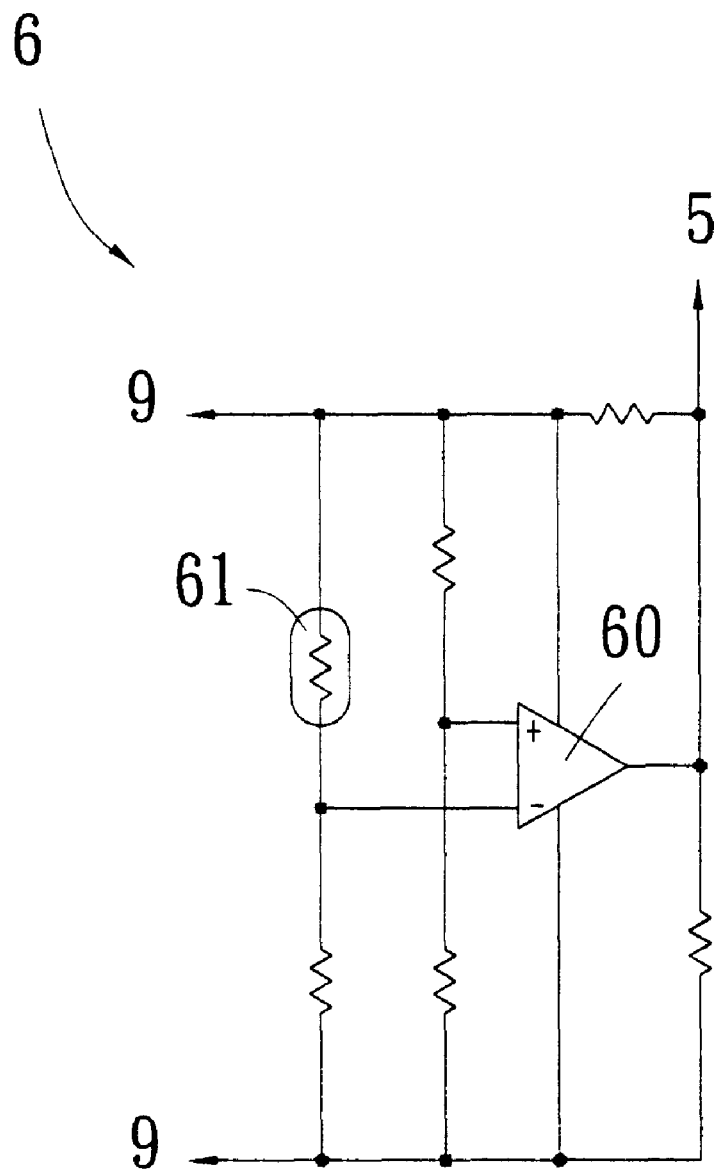
FIG. 8 is a circuit diagram of the temperature sensing circuit of the present invention.
Figure 9:
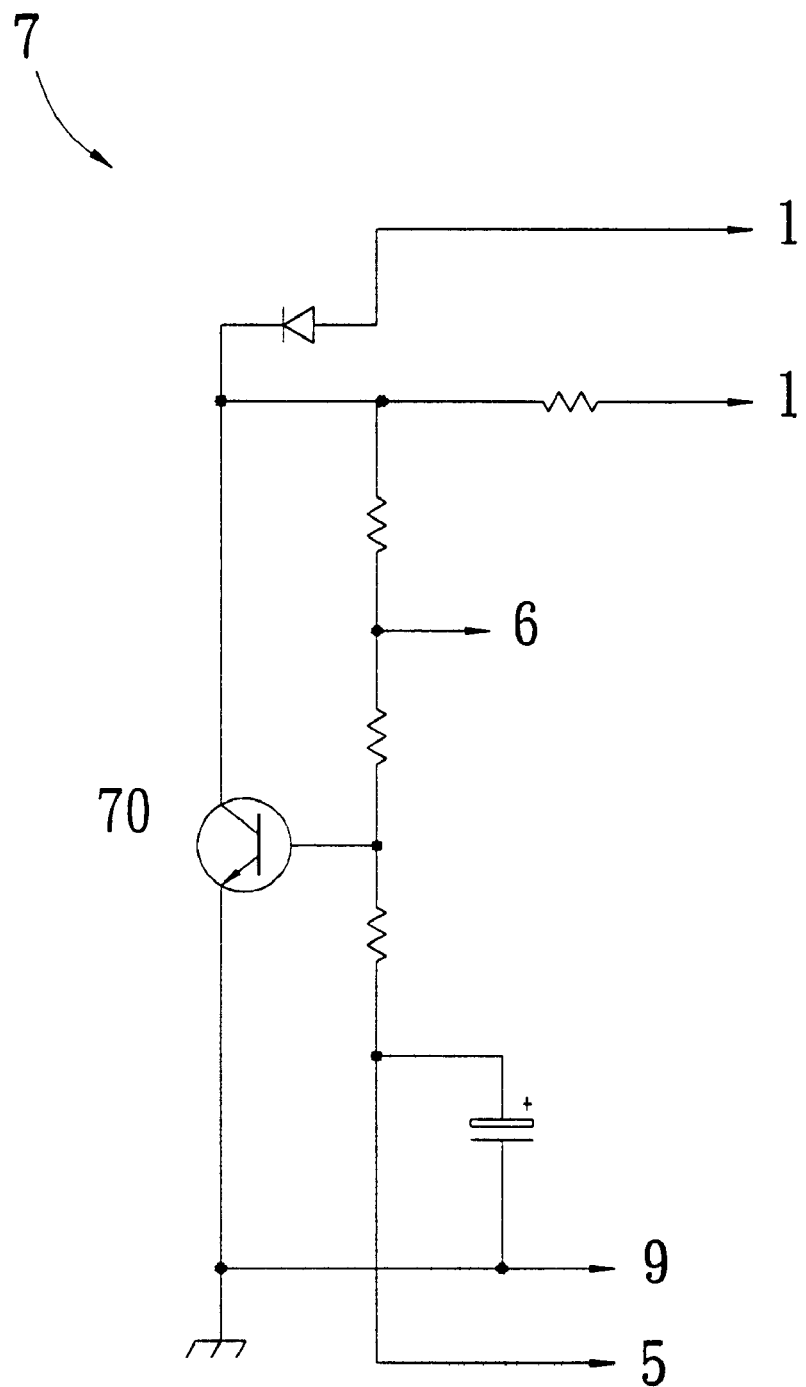
FIG. 9 is a circuit diagram of the overload detecting circuit of the present invention.
Figure 10:
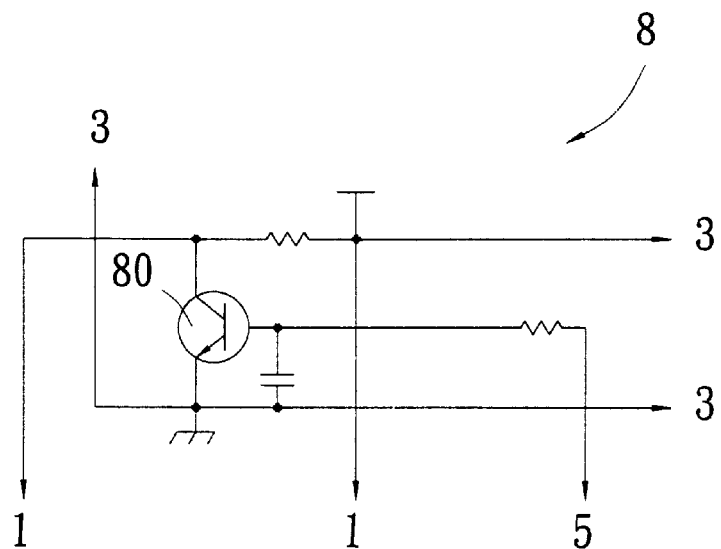
FIG. 10 is a circuit diagram of the short circuit detecting circuit of the present invention.
Figure 11:
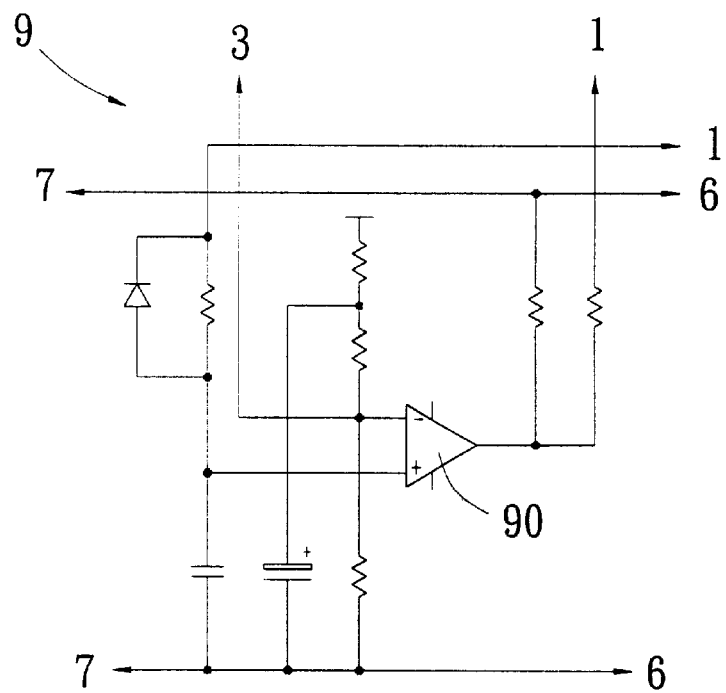
FIG. 11 is a circuit diagram of the analog-to-digital circuit (ADC) of the present invention.
Figure 12:
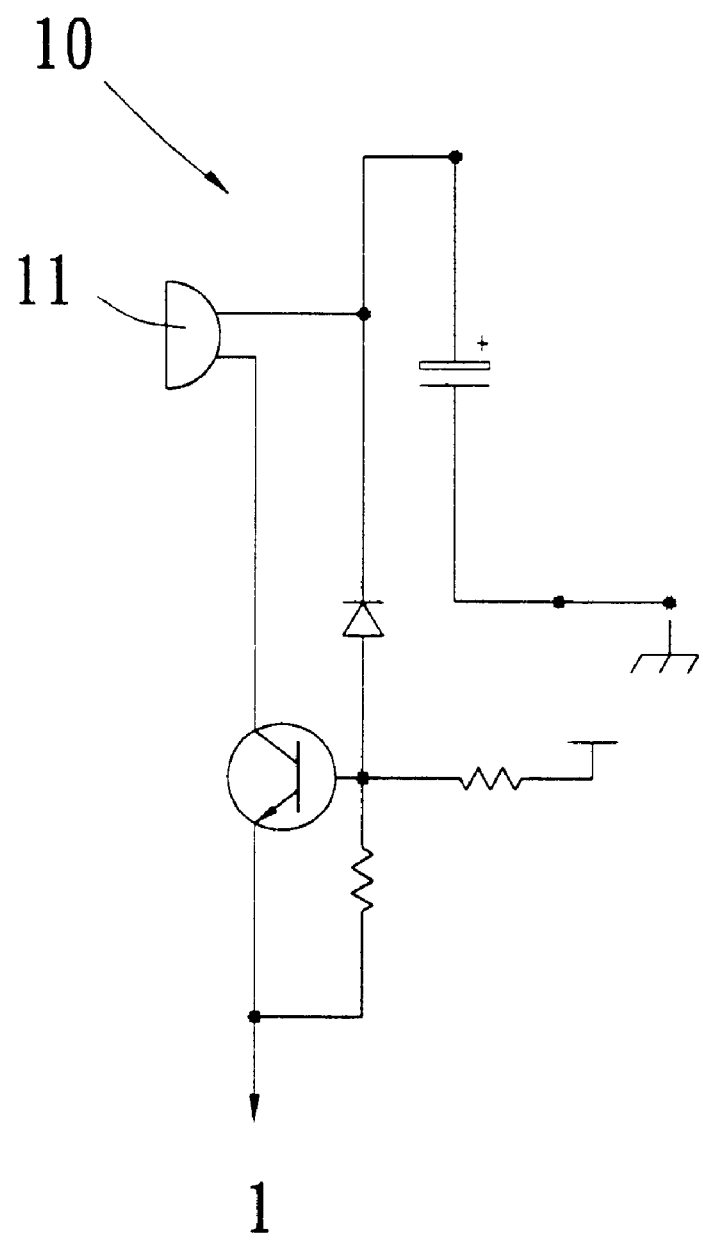
FIG. 12 is a circuit diagram of the warning circuit of the present invention.

Please refer to FIG. 3. The present invention includes CPU1, boosting circuit 2, pulse width modulating (PWM) circuit 3, sine-wave generating circuit 4, MOSFET output circuit 5, temperature sensing circuit 6, overload detecting circuit 7, short circuit detecting circuit 8, analog-to-digital converting circuit (ADC) 9 and warning circuit 10.

The boosting circuit 2 boosts the input low DC voltage into high DC voltage.

The pulse width modulating (PWM) circuit 3 serves to modulate the frequency width provided by CPU1.

The sine-wave generating circuit 4 serves to modulate the frequency provided by CPU1 to generate sine-wave with suitable amplitude.

The MOSFET output circuit 5 serves to combine high voltage with suitable frequency width and sine-wave with suitable amplitude to output all-bridge intermittent high voltage pulse.

The temperature sensing circuit 6 serves to detect whether the temperature is too high.

The overload detecting circuit 7 serves to detect overload.

The short circuit detecting circuit 8 serves to detect whether the respective circuits function normally.

The analog-to-digital converting circuit (ADC) 9 serves to convert analog signal into digital signal easy to identify.

The warning circuit 10 sends out a warning in the case that the detecting circuits detect abnormal function.

Figure 1:
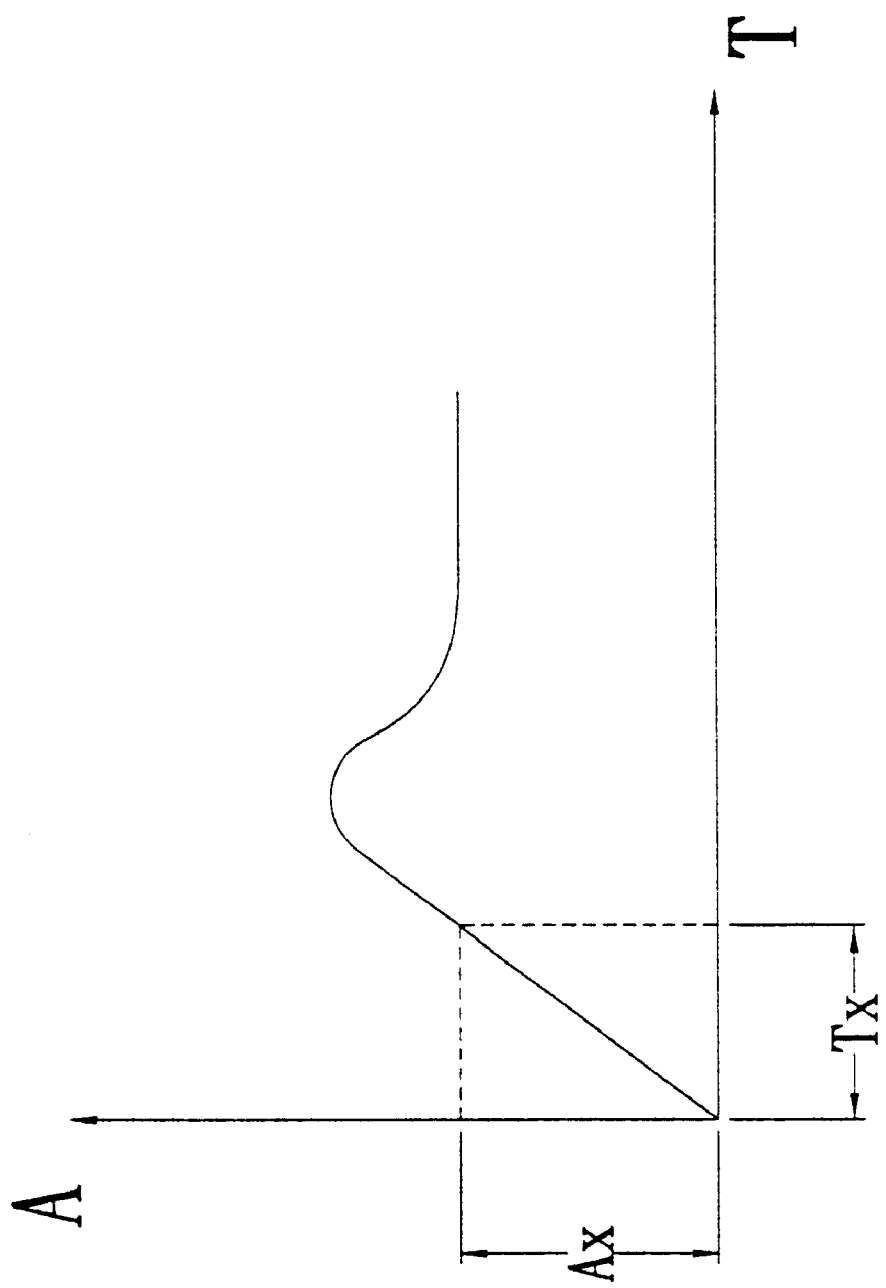
FIG. 1 is a time versus current curvature diagram of a conventional power supply.
Figure 2:
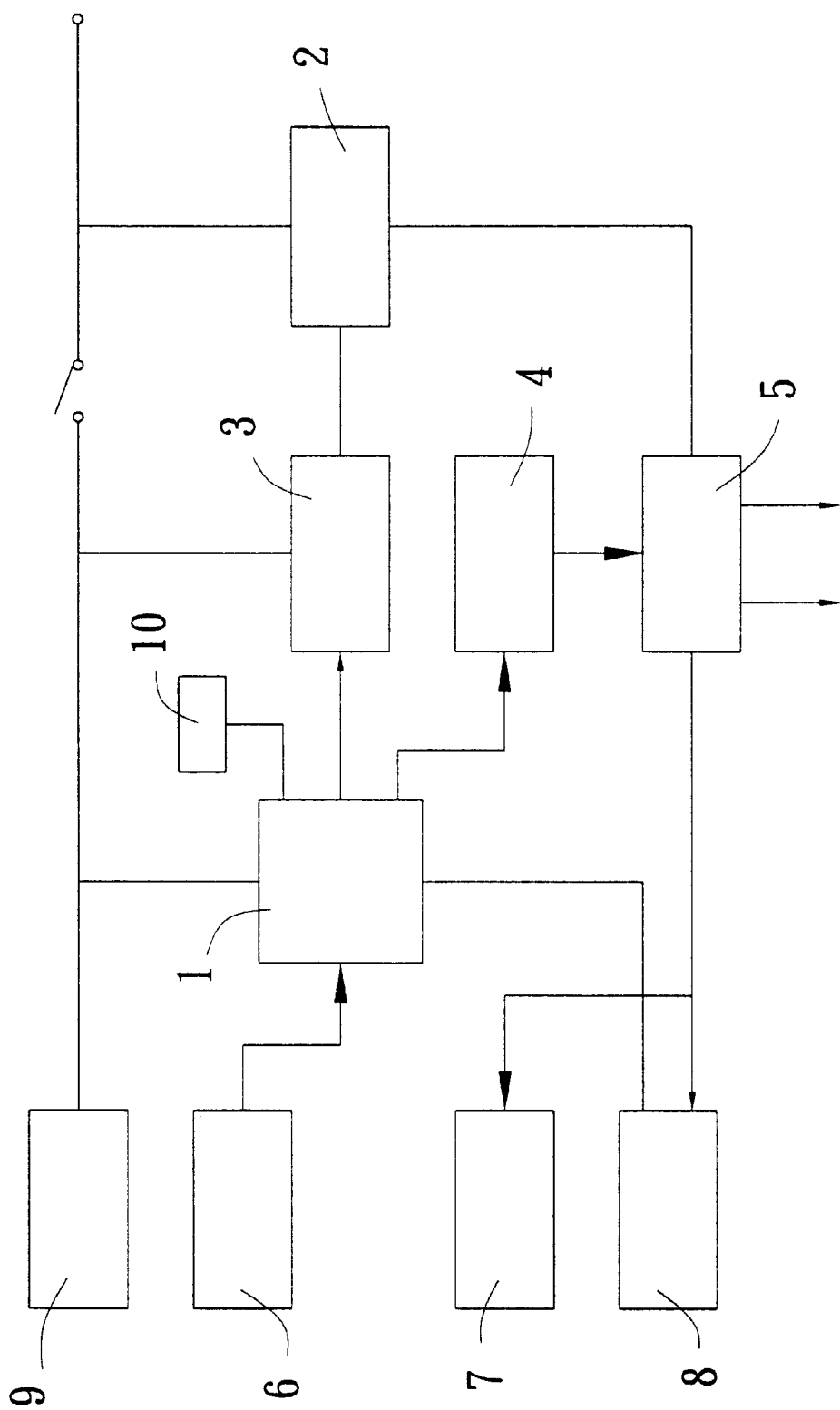
FIG. 2 is a block flow chart of the present invention.

As shown in FIG. 2, the analog-to-digital converting circuit (ADC) 9, the temperature sensing circuit 6, the overload detecting circuit 7, the short circuit detecting circuit 8, the warning circuit 10, the pulse width modulating (PWM) circuit 3 and the sine-wave generating circuit 4 are all connected to CPU1. The pulse width modulating (PWM) circuit 3 is connected with the boosting circuit 2. The boosting circuit 2 and the sine-wave generating circuit 4 are further connected with the MOSFET output circuit 5. The MOSFET output circuit 5 is connected with both the overload detecting circuit 7 and the short circuit detecting circuit 8. CPU1 collectively controls the above circuits. When activated, CPU1 respectively provides signals to the pulse width modulating (PWM) circuit 3 and the sine-wave generating circuit 4. The pulse width modulating (PWM) circuit 3 modulates the frequency provided by CPU1 into a suitable frequency width which enters the boosting circuit 2. The DC is boosted by the boosting circuit 2 and the low DC voltage of the cell is boosted into high voltage with bandwidth. It is also connected to the analog-to-digital converting circuit (ADC) 9, whereby the analog signal is converted into digital signal easy to identify. At the same time, the signal together with the sine-wave with suitable amplitude generated by the sine-wave generating circuit 4 drives the all-bridge MOSFET output circuit 5 to obtain an intermittent pulse with extremely high voltage. The MOSFET output circuit 5 is also connected with the overload detecting circuit 7 and the short circuit detecting circuit 8. In case the output exceeds the load or a short circuit takes place, the warning circuit 10 sends out a warning signal in time. In addition, CPU1 is connected with the temperature sensing circuit 6, whereby in the case of abnormal temperature of the entire circuit, the warning circuit 10 also sends out a warning signal.

FIGS. 4 to 12 show the components of the respective circuits of the present invention in detail.

The boosting circuit 1 is composed of five resistors, three capacitors, four diodes, four metal-oxide-semiconductor field effect transistors and a transformer 20. The boosting circuit 1 serves to boost the input low DC voltage into high DC voltage.

The pulse width modulating (PWM) circuit 3 is composed of eight resistors, four capacitors, four diodes and six transistors. CPU1 provides a frequency signal for this circuit to generate a wave form with suitable frequency width. The wave form enters the boosting circuit, whereby the boosted high voltage carries the wave form.

The sine-wave generating circuit 4 is composed of two transistors and six resistors. The sine-wave generating circuit 4 oscillates the frequency provided by CPU1 into sine-wave signal with identical frequency but different amplitude.

The MOSFET output circuit 5 is composed of four metal-oxide-semiconductor field effect transistors, ten resistors, four diodes, two capacitors, three Zener diodes, two transistors and a thermosensitive resistor. The sine-wave generating circuit 4 and the boosting circuit 2 input signal to the all-bridge metal-oxide-semiconductor field effect transistors which combine the PWM wave carrying great DC voltage with the sine-wave and output the wave. The output end 5 can output evenly intermittent electric pulse with high voltage.

The temperature sensing circuit 6 is composed of five resistors, a thermosensitive resistor 61 and an OPA operation amplifier 60. It is connected with CPU1 to monitor and control the temperature of the entire circuit. In case of abnormal temperature, CPU1 does not work and the warning circuit 10 sends out the warning.

The overload detecting circuit 7 is composed of four resistors, a capacitor, a diode and a transistor 70 and is connected with the MOSFET output circuit 5 and the CPU1. In case of output overload of the output end, the CPU1 does not work and the warning circuit 10 sends out the warning.

The short circuit detecting circuit 8 is composed of a resistor, two capacitors and a transistor 80 and is connected with the MOSFET output circuit 5 and the CPU1. In case of short circuit, the CPU1 does not work and the warning circuit 10 sends out the warning.

The analog-to-digital converting circuit (ADC) 9 is composed of six resistors, a diode, two capacitors and a comparator 90, serving to convert the analog signal of the circuit into digital signal easy to identify.

The warning circuit 10 is composed of two resistors, a capacitor, a diode, a transistor and a BZ1 buzzer 11. In the case that the any of the above detecting circuits detects abnormal signal, the CPU1 drives the warning circuit 10, making the buzzer 11 emit warning sound.

Figure 13:
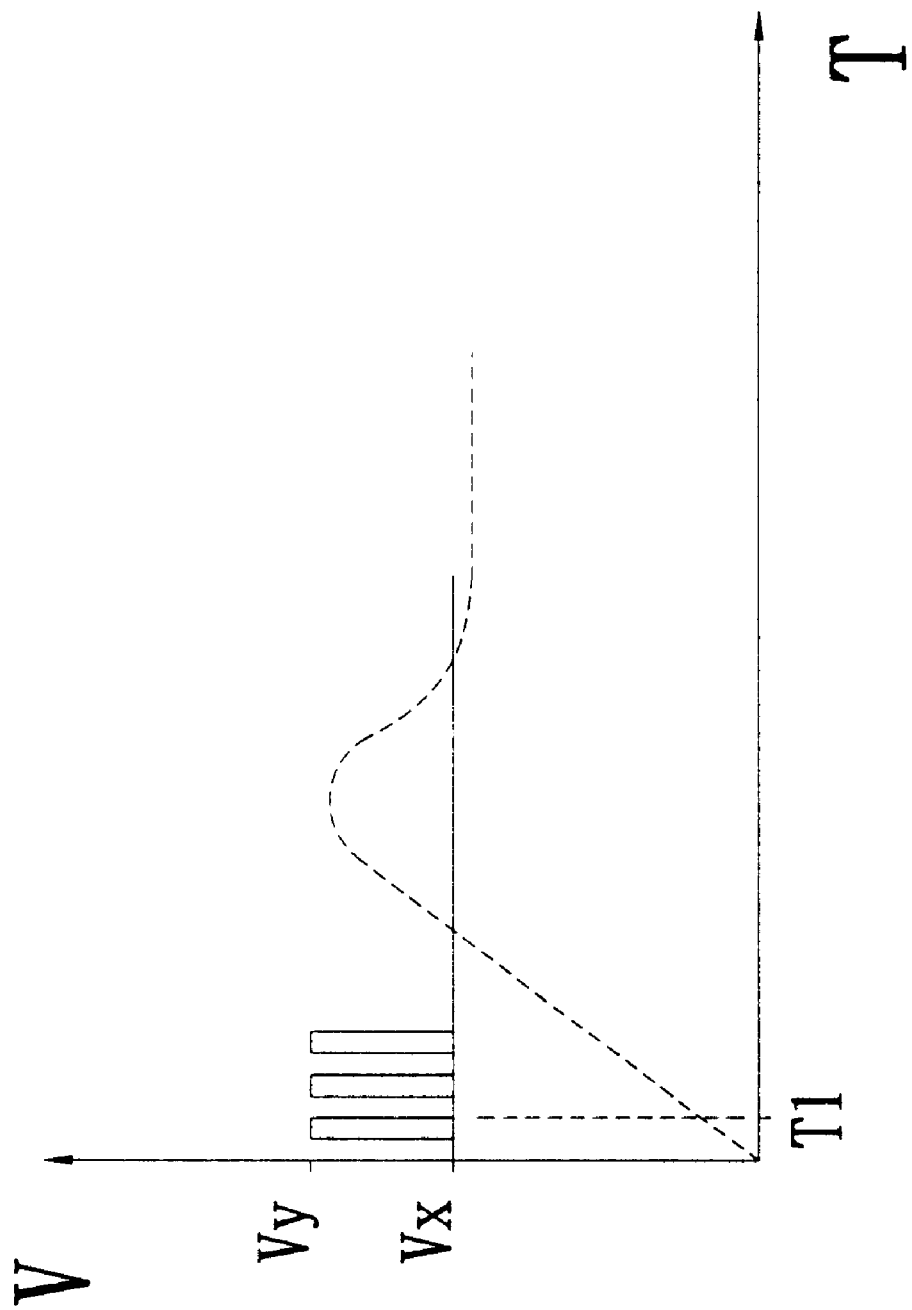
FIG. 13 is a time versus voltage curvature diagram of the present invention.

The present invention is used to activate any kind of heavy tool. In the case that the heavy tool cannot be activated at the first time, the CPU1 informs the respective circuits to start working. As shown in FIG. 13, the output voltage of the output end 50 can in very short time $T_1$ provides a pulse voltage greater than the activation voltage $V_x$. The peak value $V_y$ of the pulse voltage is much higher than $V_x$ so as to at one time quickly activate the heavy tool. In case the first pulse voltage still cannot activate the heavy tool, there are successive second, third, . . . , Nth pulse voltage until the heavy tool is activated.

In conclusion, the CPU of the present invention collectively controls the pulse width modulating (PWM) circuit, boosting circuit, sine-wave generating circuit and the all-bridge MOSFET output circuit to output signal. Also, the cooperative temperature sensing circuit, overload detecting circuit, short circuit detecting circuit and warning circuit serve to truly and effectively control the circuits. The DC voltage is converted into intermittent pulse voltage having a peak value much higher than the activation voltage. Therefore, the present invention not only is able to quickly activate the heavy tools, but also is able to protect the heavy tools.

The above embodiment is only used to illustrate the present invention, not intended to limit the scope thereof. Many modifications of the above embodiment can be made without departing from the spirit of the present invention.

What is claimed is:

1. Pulse type activating system for power supply, comprising:

a CPU for collectively controlling circuits;

a pulse width modulating (PWM) circuit for modulating the frequency width provided by the CPU;

a boosting circuit for boosting the input low DC voltage into high DC voltage;

a sine-wave generating circuit for modulating the frequency provided by the CPU to generate sine-wave with suitable amplitude;

an MOSFET output circuit for combining high voltage with suitable frequency width and sine-wave with suitable amplitude to output all-bridge intermittent pulse with high voltage;

a temperature sensing circuit for detecting whether abnormal temperature;

an overload detecting circuit for detecting overload;

a short circuit detecting circuit for detecting short circuit;

an analog-to-digital converting circuit (ADC) for converting analog signal into digital signal easy to identify; and a warning circuit for sending out a warning in time, wherein the CPU is connected with the pulse width modulating (PWM) circuit, the sine-wave generating circuit, the temperature sensing circuit, the overload detecting circuit, the short circuit detecting circuit, the analog-to-digital converting circuit (ADC) and the warning circuit, the pulse width modulating (PWM) circuit being connected with the boosting circuit, the sine-wave generating circuit being connected with the MOSFET output circuit, the boosting circuit being further connected with the MOSFET output circuit, the MOSFET output circuit being connected with both the overload detecting circuit and the short circuit detecting circuit, whereby the CPU collectively controls the above circuits and in the instant of activation of the load, the CPU provides intermittent high voltage for shortening the activation time of the load.

* * * * *